J. P. FULGHAM,

Assignor to himself and WAYNE AGRICULTURAL Co.

Grass Seed Attachment to Grain Drills.

No. 9,651. Reissued April 12, 1881.

WITNESSES

W. H. H. Knight.

W. Blacklock.

INVENTOR

Jesse P. Fulgham,
By Hill & Church
His Attys.

ATTORNEY

N. PETERS, PHOTO-LITHOGRAPHER, WASHINGTON, D. C.

UNITED STATES PATENT OFFICE.

JESSE P. FULGHAM, OF RICHMOND, INDIANA, ASSIGNOR TO HIMSELF AND WAYNE AGRICULTURAL COMPANY, OF SAME PLACE.

GRASS-SEED ATTACHMENT TO GRAIN-DRILLS.

SPECIFICATION forming part of Reissued Letters Patent No. 9,651, dated April 12, 1881.

Original No. 140,694, dated July 8, 1873. Application for reissue filed March 15, 1881.

*To all whom it may concern:*

Be it known that I, JESSE P. FULGHAM, formerly of Dublin, in the county of Wayne and State of Indiana, but now of Richmond, in said county and State, have invented certain new and useful Improvements in Grain Drilling and Seeding Machines; and I do hereby declare the following to be a full, clear, and exact description of the same, reference being had to the accompanying drawings, forming part of this specification, in which—

Figure 1:
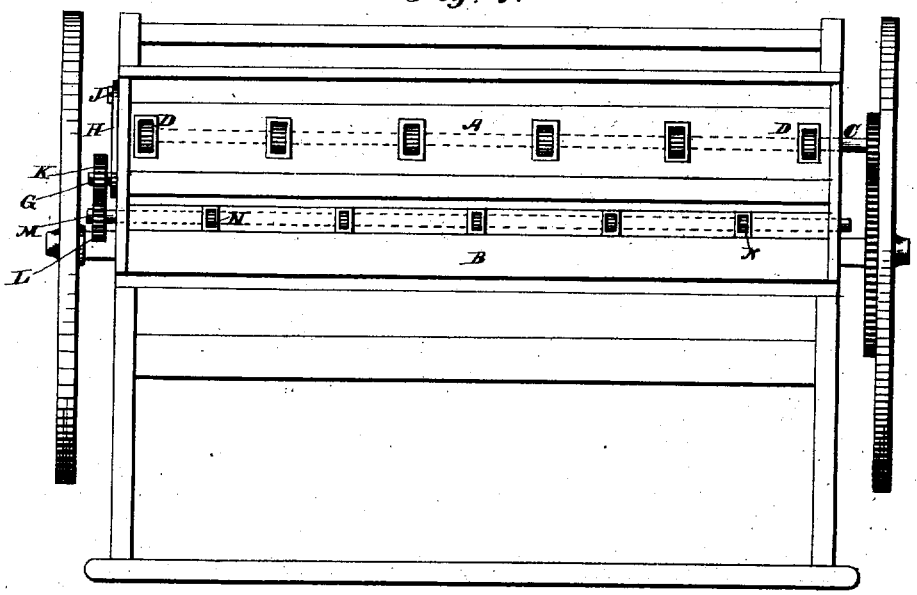
Figure 2:
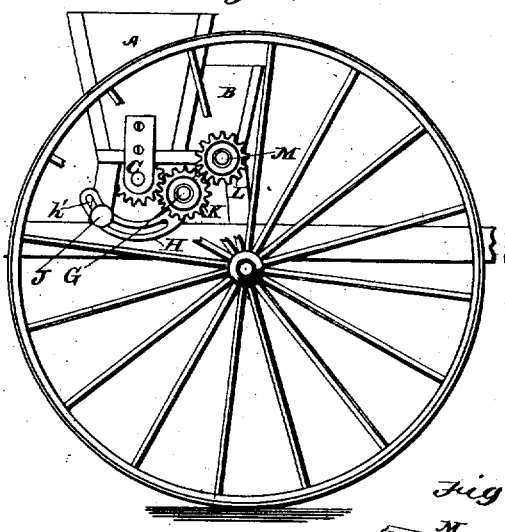
Figure 3:
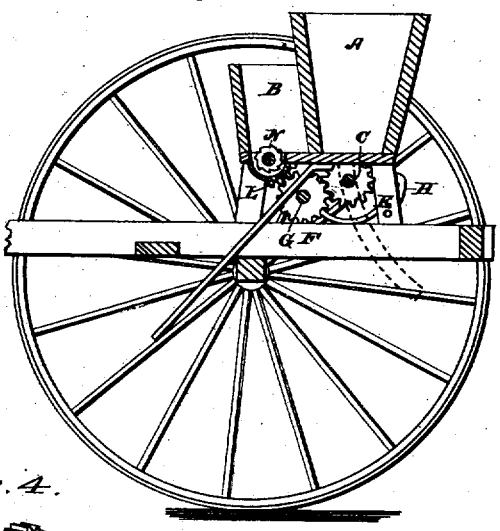
Figure 4:
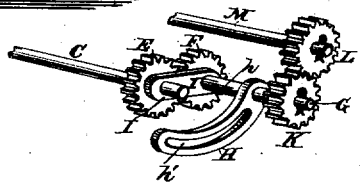

Figure 1 is a plan view of a machine containing the invention; Fig. 2, an end elevation of the same; Fig. 3, a transverse section, and Fig. 4 a perspective view of the gearing.

Similar letters of reference in the several figures indicate the same parts.

This invention relates particularly to combined grain and grass-seed drills; and it consists, primarily, in the combination of the shaft of a force-feed grain-delivering mechanism with the shaft of a force-feed grass-seed-delivering mechanism, and with gearing connecting said two shafts, whereby a regular and positive delivery of both grain and grass-seed is insured, and whereby said shafts are started or stopped simultaneously by the operation of the driving wheel or wheels.

It further consists in the combination of rotary grain and grass-seeding shafts provided with pinions and intermediate adjustable gearing, which may be thrown into and out of action at will, in order that the grass-seeder may be driven from the grain-feeding shaft, or the latter operated alone at will.

It further consists in the combination of rotary grain and grass-seeding shafts provided with pinions, adjustable intermediate pinions mounted on a shaft in an intermediate arm or link, and means for locking the arm or link in adjusted position; and it consists, lastly, in certain other details of construction, which will be hereinafter particularly described and claimed.

In the drawings, A represents the grain box or hopper of an ordinary grain-drill, and B the grass-seed box attached thereto.

C is the rod or shaft which carries the series of feed-wheels D for delivering the grain. This shaft may be driven from one of the ground-wheels in any customary way, and at the opposite end to that at which it receives its motion it is furnished with a spur-wheel, E, which gears with another wheel, F, on the end of a shaft, G, that is journaled within and passes through a jack-plate, H. A link, I, uniting the shafts C and G, supports the wheel F in proper mesh with the wheel E. The jack-plate H has at one end a hub, *h*, in which the shaft G is journaled. It is attached to the frame or hopper-head by a bolt, J, passing through a slot, *h'*, and the shaft G is thus fixedly supported in any desired position.

The outer end of the shaft G carries a readily-movable spur-wheel, K, which gears with a similar wheel, L, on the end of a shaft, M. This shaft M is journaled longitudinally under or in the bottom of the grass-seed box B, and carries a series of minute feed-wheels, N, which may be similar in construction to those which deliver the grain. A positive or force feed insuring the delivery of the grass-seed is thus provided.

Either or both of the wheels K L may be removed and larger or smaller wheels substituted on the respective shafts, as may be necessary, to increase or reduce the relative speed of the grass-seed feed-shaft to the desired extent. The slotted jack-plate H permits this employment of changeable gearing and supports the intermediate shaft G in its different positions with equal efficiency. It also serves to hold the spur-wheel K out of mesh, to render the shaft M inoperative when grass-seed is not to be sown. When the shaft M is not thus disconnected, as in ordinary use, it is stopped and started simultaneously with the shaft C, and any separate clutch or stopping mechanism is dispensed with.

The grass-seed, as delivered by the wheels N, may be scattered by means of a suitable rack or chute, such as described in my patent for seed-drill, granted July 9, 1867, No. 66,578.

The provision of a grain-drill with a grass-seeding attachment is not claimed herein as new, nor the employment of interchangeable gear-wheels of divers sizes for giving a variable feed. Such features of the gearing for connecting the two feed-shafts of this machine as are shown in my Patent No. 100,998, dated March 22, 1870, are also disclaimed as forming no part of the present invention in themselves considered.

The following is claimed as new, viz:

1. In a grain-drill, the combination of the shaft of a force-feed grain-delivering mechanism with the shaft of a force-feed grass-seed-delivering mechanism and with gearing connecting said two shafts, whereby a regular and positive delivery of both grain and grass-seed is insured, and whereby said shafts are started or stopped simultaneously by the operation of the driving wheel or wheels, substantially as described.

2. In a grain-drill, the combination of rotary grain and grass-seeding shafts provided with pinions and intermediate adjustable gearing, which may be thrown into and out of action at will, in order that the grass-seeder may be driven from the grain-feeding shaft, or the latter operated alone at will, substantially as described.

3. In a grain-drill, the combination of rotary grain and grass-seeding shafts provided with pinions, adjustable intermediate pinions mounted on a shaft in an intermediate arm or link, and means for locking the arm or link in adjusted position, substantially as described.

4. The combination of the feed-shafts C M, counter-shaft G, gearing E F and K L, jack-plate H, link I, and bolt J, arranged and operating substantially as herein described, for the purpose specified.

JESSE P. FULGHAM.

Witnesses:
FRED. F. CHURCH,
WM. A. BLACKSTOCK.